United States Patent
Frank et al.

(10) Patent No.: US 7,716,925 B2
(45) Date of Patent: May 18, 2010

(54) CLOSURE WITH A THERMAL SAFEGUARD FUNCTION

(75) Inventors: Anton Frank, Oberspeltach (DE); Oliver Nöhl, Satteldorf (DE); Harold Hoffeld, Crailsheim (DE)

(73) Assignee: Voith Turbo GmbH & Co., Heidenheim (DE)

( * ) Notice: Subject to any disclaimer, the term of this patent is extended or adjusted under 35 U.S.C. 154(b) by 654 days.

(21) Appl. No.: 10/584,184

(22) PCT Filed: Dec. 13, 2004

(86) PCT No.: PCT/EP2004/014190

§ 371 (c)(1), (2), (4) Date: Mar. 30, 2007

(87) PCT Pub. No.: WO2005/064178

PCT Pub. Date: Jul. 14, 2005

(65) Prior Publication Data

US 2007/0251228 A1    Nov. 1, 2007

(30) Foreign Application Priority Data

Dec. 23, 2003  (DE)  ................ 103 61 440

(51) Int. Cl.
*F16D 33/00*  (2006.01)

(52) U.S. Cl. ........................................... 60/337

(58) Field of Classification Search .......... 60/330, 60/336, 337; 49/1
See application file for complete search history.

(56) References Cited

U.S. PATENT DOCUMENTS

| | | | |
|---|---|---|---|
| 2,216,351 A | | 10/1940 | Miller |
| 3,377,957 A | * | 4/1968 | Bilton ......................... 60/336 |
| 3,436,916 A | | 4/1969 | Becker |
| 4,086,991 A | | 5/1978 | Swadley .................... 192/82 T |
| 4,339,916 A | | 7/1982 | Burch et al. ............... 60/39.02 |
| 4,581,892 A | * | 4/1986 | Ahrens et al. ................. 60/330 |
| 5,251,441 A | * | 10/1993 | Eon et al. ..................... 60/330 |
| 5,561,975 A | * | 10/1996 | Gambini ...................... 60/338 |

FOREIGN PATENT DOCUMENTS

| | | |
|---|---|---|
| BE | 389 304 A | 6/1932 |
| DE | 33 37 532 A1 | 5/1985 |
| EP | 0 801 243 | 7/2002 |
| GB | 153 122 A | 11/1920 |
| GB | 963 392 A | 7/1964 |

* cited by examiner

*Primary Examiner*—Michael Leslie
(74) *Attorney, Agent, or Firm*—Ohlandt, Greeley, Ruggiero & Perle, L.L.P

(57) ABSTRACT

The invention relates to a closure with a thermal safeguard function, comprising a closure body (1), which is used to seal a cavity (10) that is to be closed; a fusible safeguard element (2), which is inserted into the closure body and which keeps closed, at least indirectly, a through-opening (1.1), which is formed in the closure body. The inventive closure with a thermal safeguard function is characterized by the following features: the closure body comprises a bushing (3) provided with a continuous bore (3.1); the bushing is inserted into the through-opening of the closure body at an axial end (1.3) in such a way that the continuous bore and the region of the through-opening that is axially adjacent to the bushing are aligned flush with each other; the fusible safeguard element completely fills the continuous bore of the bushing over the entire cross section thereof along a given axial length.

19 Claims, 1 Drawing Sheet

CLOSURE WITH A THERMAL SAFEGUARD FUNCTION

RELATED APPLICATIONS

This application claims priority in PCT International Application No. PCT/EP2004/014190, filed Dec. 13, 2004, and German Application No. DE 103 61 440.0, filed on Dec. 23, 2003, the disclosures of which are incorporated herein by reference.

The invention relates to a closure with a thermal safeguard function in accordance with the preamble of claim 1. In particular, the invention relates to hydrodynamic turbomachines, the working chamber of which is closed off from the surroundings by way of a closure with a thermal safeguard function.

Closures with a thermal safeguard function are known. Such closures serve to seal a cavity of, for example, the working chamber of a hydrodynamic coupling, which is filled with a working medium, from the surroundings. As a rule, such a closure is inserted into a housing that directly forms the cavity or at least indirectly surrounds it. The closure is in thermally conducting connection with the contents of the cavity, which comprise, for example, a working medium in the form of a fluid.

The thermal safeguard function in the sense of the present invention means that the closure, which takes on a temperature that depends on the temperature in the interior of the cavity, is fluid-tight below a pre-given temperature threshold and opens automatically above a pre-given threshold. When used, for example, in a hydrodynamic turbomachine, this serves particularly a hydrodynamic coupling, to ensure that the working medium is drained automatically from the hydrodynamic coupling when an inadmissible upper temperature limit is attained. In this way, an excessive overheating of the hydrodynamic coupling is prevented.

Figure 1:
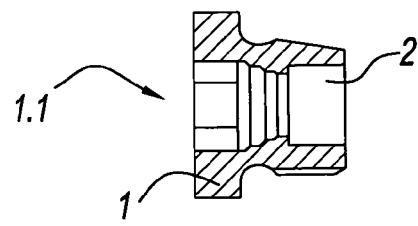

Known closures with a thermal safeguard function are designed as fusible screw plugs. Such a fusible screw plug in accordance with the prior art is shown in FIG. 1. The fusible screw plug has a basic body, in which a continuous bore is made.

The continuous bore is closed in a fluid-tight manner by a fusible solder, which is introduced with a substantial thickness over the entire cross section of the continuous bore. The fusible screw plug prepared in advance is screwed into an opening of the surrounding wall of a cavity that is to be closed—for example, into the housing of a hydrodynamic turbomachine—and sealed with respect to the wall by, for example, a gasket below the screw plug head.

In order to be able to withstand high pressures in the interior of the cavity and to ensure a secure closure function, it is necessary to design the fusible solder with a substantial thickness over the entire cross section of the continuous bore in the fusible screw plug. This leads to relatively large volume of fusible solder. When such a fusible screw plug is employed in the housing wall of a hydrodynamic coupling, for example, a fusible solder volume of 700 cubic millimeters ($mm^3$) is required if a continuous bore with a diameter of 9 millimeters in the fusible screw plug is to be closed securely.

The known closures with a thermal safeguard function have disadvantages. An especially serious drawback is that the response time, that is, the time until the safeguard function is triggered by unblocking the cross section that is closed by the fusible solder has not been precisely reproducible thus far, especially when the closures are used in hydrodynamic couplings. Thus, different fusible screw plugs of one and the same series have been triggered at different times in the same hydrodynamic coupling. Even in cases in which the flow passage in a fusible screw plug was closed nearly identically by the fusible solder after triggering, the fusible screw plug replacement had a different triggering time compared with the original fusible screw plug. The reason for the poor reproducibility of the triggering behavior of fusible screw plugs of the prior art was previously unknown.

The invention is based on the problem of presenting a closure with a thermal safeguard function that is improved over the prior art. In particular, the inventive closure with a thermal safeguard function is to have a precisely reproducible triggering behavior and is to be characterized, in particular, by short response times. Such a closure should thereby be suited for use to seal the working chamber of a hydrodynamic turbomachine, particularly a hydrodynamic coupling.

The inventive problem is solved by a closure in accordance with either claim 1 or 2. The subclaims describe especially advantageous further developments of the invention.

The inventive closure has a closure body, which can be inserted into an opening that is to be sealed. For example, the closure body can be inserted into the housing wall of a hydrodynamic turbomachine, particularly a hydrodynamic coupling, in order, in this way, to seal the working chamber inside the coupling housing from the surroundings.

The closure has a fusible safeguard element, which is inserted into the closure body. The fusible safeguard element keeps closed a through-opening, which is formed in the closure body, below a pre-given threshold temperature. Above a pre-given temperature limit, the fusible safeguard element melts and thereby unblocks the through-opening in the closure body.

According to a first embodiment, the closure body comprises a bushing, which is inserted into the through-opening of the closure body at an axial end thereof in such a way that a continuous bore, which is formed in the axial direction of the bushing, is aligned flush with the region of the through-opening of the closure body that is axially adjacent to the inserted bushing. The fusible safeguard element thereby does not directly fill the through-opening in the closure body—that is, in particular, it is not in direct contact with the closure body, but rather it is inserted, preferably exclusively, into the continuous bore of the inserted bushing in such a way that it completely fills the entire cross section of this through-opening along a pre-given axial length. Here, the term complete filling is to be understood as any filling of the free cross section of the continuous bore that is at least essentially complete.

The bushing is sealed with respect to the closure body, for example, by being soldered in. According to an alternative embodiment, the fusible safeguard element is inserted directly into the closure body; that is, within an axial region of the through-opening, it is provided so as to close the through-opening completely or at least essentially completely. Viewed in the axial direction, the closure body has a first axial end and a second axial end, between which the through-opening extends, the fusible safeguard element keeping the through-opening closed in the region of one axial end. Chosen for this purpose is the axial end that faces the interior of a cavity when the closure is inserted in a wall bounding the cavity.

In the region of this axial end, which is referred to here as the second axial end and which is closed by the fusible safeguard element, the closure body is furnished with a cylindrical or essentially cylindrical axial prolongation; that is, this prolongation extends essentially in the axial direction of the closure body. In so doing, the prolongation has a wall thickness that is reduced relative to the wall thickness of the remaining region of the closure body. The axial prolongation thereby has an axial extension such that the fusible safeguard element, which, in particular, is sealed flush against the outer axial end of the axial prolongation, is surrounded over at least half of its axial length by the axial prolongation in the circumferential direction.

The two alternative embodiments of the invention that have been described exhibit a basic common finding arrived at by the inventors. Namely, the inventors have recognized that the poor reproducibility of the response behavior of conventional closures with a thermal safeguard function, which, in particular, like the present invention according to a preferred embodiment, are designed as a fusible screw plug, was due to the too-large influence of the heat capacity of the closure body on the fusible safeguard element. In accordance therewith, the inventors have further developed the conventional fusible screw plug in such a way that the influence of the thermal capacity of the closure body on the fusible safeguard element, particularly on the fusible solder which is soldered in the through-opening of the closure body, is substantially reduced. According to the first embodiment of the invention that has been described, an insulation is provided between the closure body and the fusible safeguard which is by the inserted bushing. The insulating effect can be advantageously increased in that a cavity is enclosed between the bushing and the closure body, said cavity being filled, for example, by air, or, especially advantageously, containing a vacuum.

According to a second embodiment, the influence of the heat capacity of the closure body on the fusible safeguard element is reduced by designing the closure body with an extremely small heat capacity in the region adjacent to the fusible safeguard element, particularly next to the inserted fusible solder. This is accomplished in accordance with the invention in that the wall thickness of the closure body is reduced by providing the axial prolongation, so that the fusible safeguard element is surrounded by a smaller mass of the closure body, which has a correspondingly smaller heat capacity.

Both embodiments are characterized, on the one hand, by an especially fast response at elevated temperatures and, on the other hand, also by an extremely precise response.

The fusible safeguard element is advantageously a eutectic fusible solder, which is introduced into the through-opening of the closure body or into the continuous bore of the bushing. When a fusible solder is introduced, this fusible solder advantageously has an axial length of less than 9 millimeters, particularly a length of 8 millimeters. However, due to the required resistance to pressure, particularly for use in hydrodynamic couplings, the fusible solder advantageously should have a length of at least 5 millimeters. In order to attain an especially short axial length, the through-opening in the closure body and/or particularly the continuous bore in the bushing is provided with a cross-section expansion in the form of at least one step in the region of the outermost axial end. Such a design is shown by the drawings described further below. The stepwise design of the axial course of the through-opening or of the continuous bore makes it possible to achieve the transmission of a thrust force from the fusible solder onto the bushing or onto the closure body or from the bushing onto the closure body when the closure is subjected to an axial force on its front side, that is, for example, by way of a corresponding overpressure in the cavity that is sealed by the closure body.

In order for the inventive closure with a thermal safeguard function to enable a rapid evacuation of the cavity that is sealed by it, the through-opening carrying the flow advantageously has a minimum diameter of at least 11 millimeters over its entire axial length.

The axial prolongation in accordance with the second embodiment according to the invention advantageously has a wall thickness of at most 2.5 millimeters, particularly a wall thickness in the range of 1 to 2 millimeters or even less.

The inventive closure is suited, in particular, for use in a hydrodynamic turbomachine, particularly in a hydrodynamic coupling or even in a hydrodynamic brake or a hydrodynamic converter for sealing a working chamber of the hydrodynamic turbomachine from the surroundings.

The invention will be described in greater detail below on the basis of two embodiment examples.

Figure 2:
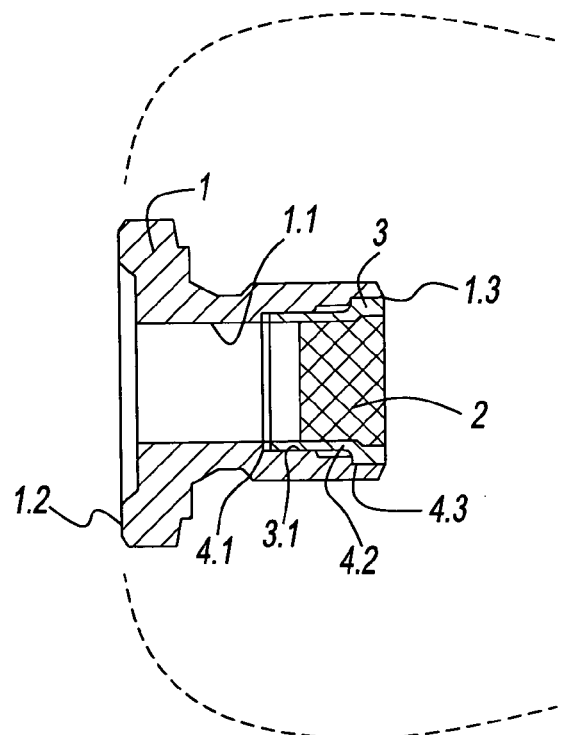
Figure 3:
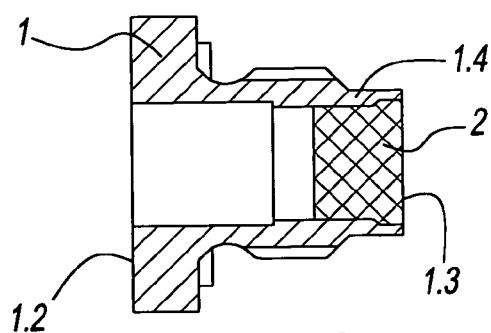

Shown are:

FIG. 1 a closure in the form of a fusible screw plug according to the prior art;

FIG. 2 a first embodiment of a closure designed in accordance with the invention with a thermal safeguard function in the form of a fusible screw plug;

FIG. 3 a second embodiment of the inventive closure in the form of a fusible screw plug.

FIG. 1 shows a closure according to the prior art. As is seen, the closure has a closure body 1 with a through-opening 1.1, which is closed by a fusible safeguard element 2. The fusible safeguard element 2 is a fusible solder, which is introduced over the entire cross section of the through-opening 1.1 into the through-opening 1.1 and which has a substantial thickness.

Such a closure according to the prior art, which is inserted, for example, into the housing of a hydrodynamic coupling, has a response delay that leads to an excess temperature of the operating medium of approximately 50 K, depending on the rate of heating of the operating medium. This means that the temperature of the operating medium of the hydrodynamic coupling is approximately 50 K higher than the nominal temperature of the fusible solder. Furthermore, as already discussed in detail in the introduction of the specification, the reproducibility of the response behavior of the depicted closure is not satisfactory.

Shown in FIG. 2 is a first embodiment of an inventive closure. As is seen, this embodiment has a basic body 1 with a through-opening 1.1, which is provided with three steps in the region of the axial end facing cavity 10 (depicted here only in part). Accordingly, through-opening 1.1 expands from a diameter that, as is shown, is still initially 11 millimeters in the region of its first axial end, in three steps in the direction of its second axial end. The first step-shaped expansion 4.1 serves to accommodate the bushing 3 in such a way that through-opening 1.1 and continuous bore 3.1 in the bushing are aligned flush with each other. The second step-shaped expansion 4.2 serves to form a cavity between bushing 3 and closure body 1. Finally, the third step 4.3 serves to accommodate a shoulder in the radial direction of bushing 3 so as to create thereby a support in the axial direction between bushing 3 and closure body 1, by means of which an axial thrust force that is applied on the front side of the fusible safeguard element, in this case a eutectic fusible solder, or on bushing 3 on the side of cavity 10, is conveyed into closure body 1. For the same reason, the diameter of the continuous bore 3.1 in bushing 3 is also provided with a step-shaped expansion in the region of the axial end thereof, so that the thrust force of the fusible solder can be transmitted to bushing 3. The fusible solder can therefore be designed with a comparatively short axial length, here with an axial length of 8 millimeters, a tolerance of +/−1 millimeter being advantageous.

In the region of the second axial end, that is, the end that faces cavity 10, the continuous bore 3.1 in bushing 3 has a diameter of 12 millimeters; at the opposite end of the bushing as well as over nearly the remaining axial region of the through-opening 1.1, a diameter of 11 millimeters is provided. At its first axial end, as shown, the through-opening 1.1 can be provided with a marked cross-sectional expansion in order to facilitate the outflow of medium from cavity 10 in the case of triggering.

The bushing is advantageously made from a thermally well-conducting material—for example, from copper. The closure body 1 can be made, for example, from $CuZn_{39}Pb_3F_{43}$.

Depicted in FIG. 3 is a second embodiment of an inventive closure. This embodiment has the inventive cylindrical axial prolongation 1.4 on the second axial end 1.3 of the closure body 1. As is seen, this cylindrical prolongation initially has a wall thickness of 1.5 millimeters and, in the outermost region of the second axial end 1.3, a wall thickness of 1 millimeter. The entire axial prolongation 1.4 can be flushed with medium that is taken up in cavity 10, so that the temperature of the medium in cavity 10 is transmitted very directly to the fusible safeguard element 2, here a eutectic fusible solder. Due to the small wall thickness of the axial prolongation, the influence of the heat capacity of this region of closure body 1 is very small. A rapid and very precisely reproducible triggering function of the closure is achieved.

Similar to FIG. 2, here, too, the through-opening 1.1 is provided with a step-shaped cross-sectional expansion in the region of the second axial end 1.3. On the one hand, this results in an even smaller wall thickness of the axial prolongation in the outermost axial region and, on the other hand, the above-described axial transmission of thrust force from the fusible safeguard element onto closure body 1 is made possible. This step-shaped cross-sectional expansion in through-opening 1.1 extends, in particular, from the outer axial end 1.3 up to at most half of the inserted fusible safeguard element, that is, here up to at most 4 millimeters axially into the through-opening 1.1. Another embodiment has (as depicted) an axial extension of this cross-sectional expansion of 2 mm, that is, for example, a quarter of the axial extension of the fusible safeguard element.

In the embodiment example shown in FIG. 3, closure body 1 can be constructed, for example, from the same material as the closure body in FIG. 2. Alternatively, St52-3 may be also used for one or both embodiments as material for the closure body.

The two closures shown in FIGS. 2 and 3 have a comparatively long axial length, namely, a length of 25 millimeters. This results in the fact that the fusible solder is located comparatively far inside cavity 10, whereby, on the one hand, the influences of the surroundings are reduced and, on the other hand, the influence of the temperature in cavity 10 on the fusible safeguard element 2 becomes more direct.

The invention claimed is:

1. A closure for a hydrodynamic turbomachine having a cavity, the closure comprising:
    a closure body for sealing the cavity that is to be closed;
    a fusible safeguard element inserted into the closure body for closing a through-opening in the closure body;
    the closure body comprising a bushing with a continuous bore and the bushing being inserted into the through-opening of closure body at an axial end, the continuous bore and the region of the through-opening that is axially adjacent to the bushing being aligned flush with each other,
    wherein the fusible safeguard element completely fills the continuous bore of the bushing over an entire cross section thereof along a predetermined axial length,
    wherein the fusible safeguard element is a fusible solder that is soldered in the continuous bore of the bushing,
    wherein the bushing is disposed at an axial end in which the fusible solder is positioned,
    wherein the bushing has a step-shaped expansion of the cross section so that a portion of the fusible solder comes to rest on the bushing in the axial direction so that an axial thrust force can be transmitted from the fusible solder onto the bushing,
    wherein the step-shaped expansion is designed in that the axial end facing the interior of the cavity when the closure is inserted into a wall bounding the cavity and the fusible solder projects axially beyond the step-shaped expansion, and
    wherein the fusible safeguard element has a circumferential edge that is completely enclosed by the closure body.

2. The closure according to claim 1, wherein the closure body is provided with three step-shaped expansions in the region accommodating the bushing and wherein the bushing comprises a shoulder in the radial direction so that a cavity is created between the bushing and the closure body.

3. The closure according to claim 1, wherein the fusible solder has an axial length of at most 9 millimeters.

4. The closure according to claim 1, wherein the fusible solder has an axial length of 8 millimeters.

5. The closure according to claim 1, wherein the fusible solder has a length of at least 5 millimeters.

6. The closure according to claim 1, wherein the through-opening and the continuous bore have a minimum diameter of at least 11 millimeters.

7. The closure according to claim 1, wherein the closure seals a working chamber of a hydrodynamic coupling, a hydrodynamic brake or a hydrodynamic converter.

8. A hydrodynamic turbomachine comprising:
    a cavity and a closure,
    wherein the closure comprises:
        a closure body for sealing the cavity that is to be closed;
        a fusible safeguard element inserted into the closure body, and keeps at least indirectly closed a through-opening formed in closure body,
        the closure body having a first axial end and a second opposite axial end, wherein the through-opening extends in the axial direction from the first axial end to the second opposite axial end and is closed in the region of the second opposite axial end by the fusible safeguard element,
        the closure body having a substantially cylindrical axial prolongation in a region of the second opposite axial end, which has a wall thickness that is reduced relative to the wall thickness of remaining closure body and which forms an axial section of the surrounding outer wall of the through-opening, wherein the fusible safeguard element is enclosed over at least half of its axial length by the axial prolongation in the circumferential direction,
    wherein the fusible safeguard element is a fusible solder that is soldered in the through-opening in the closure body,
    the through-opening being formed at its axial end, in which the fusible solder is arranged, with a step-shaped expansion of the cross section, so that a portion of the fusible solder comes to rest against the closure body in the axial direction in such a way that an axial thrust force can be transmitted from the fusible solder onto the closure body, wherein the step-shaped expansion is designed in that axial end which faces the interior of the cavity when the closure is inserted into a wall bounding a cavity and the fusible solder projects axially beyond the step-shaped expansion, and wherein the fusible safeguard element has a circumferential edge that is completely enclosed by the closure body.

9. The closure according to claim 8, wherein the fusible solder defines an axial prolongation that has a wall thickness of at most 2.5 millimeters.

10. The closure according to 8, wherein the fusible solder defines an axial prolongation having a wall thickness of 1 millimeter to 2 millimeters.

11. The turbomachine according to claim 8, wherein the fusible solder has an axial length of at most 9 millimeters.

12. The turbomachine according to claim 8, wherein the fusible solder has an axial length of 8 millimeters.

13. The turbomachine according to claim 8, wherein the fusible solder has a length of at least 5 millimeters.

14. The turbomachine according to claim 8, wherein the through-opening and the continuous bore have a minimum diameter of at least 11 millimeters.

15. The turbomachine according to claim 8, wherein the axial prolongation has a wall thickness of at most 2.5 millimeters.

16. The turbomachine according to 8, wherein the axial prolongation having a wall thickness of 1 millimeter to 2 millimeters.

17. A method of sealing a cavity in a hydrodynamic turbomachine comprising:

providing a cavity and a closure body, the closure body sealing the cavity;

inserting a fusible safeguard element into the closure body and at least indirectly closing a through-opening formed in the closure body, wherein the fusible safeguard element has a circumferential edge that is completely enclosed by the closure body;

soldering a fusible solder to form a fusible safeguard element in the through-opening in the closure body; and resting at least a portion of the fusible solder against the closure body in the axial direction so that an axial thrust force is transmitted from the fusible solder onto the closure body.

18. The method according to claim 17, further comprising:

providing a three step-shaped expansion in a region of the closure body accommodating a bushing so that the cavity is created between the bushing and the closure body.

19. The method according to claim 17, further comprising providing the through-opening and the continuous bore with a minimum diameter of at least 11 millimeters.

* * * * *